July 19, 1966  T. G. FOSTER ET AL  3,261,395
REFRIGERATION SYSTEM CONTROL
Filed Jan. 8, 1964  2 Sheets-Sheet 1

INVENTORS
THEODORE G. FOSTER.
DAVID N. SHAW.
BY
Frederick E. McMullen
ATTORNEY.

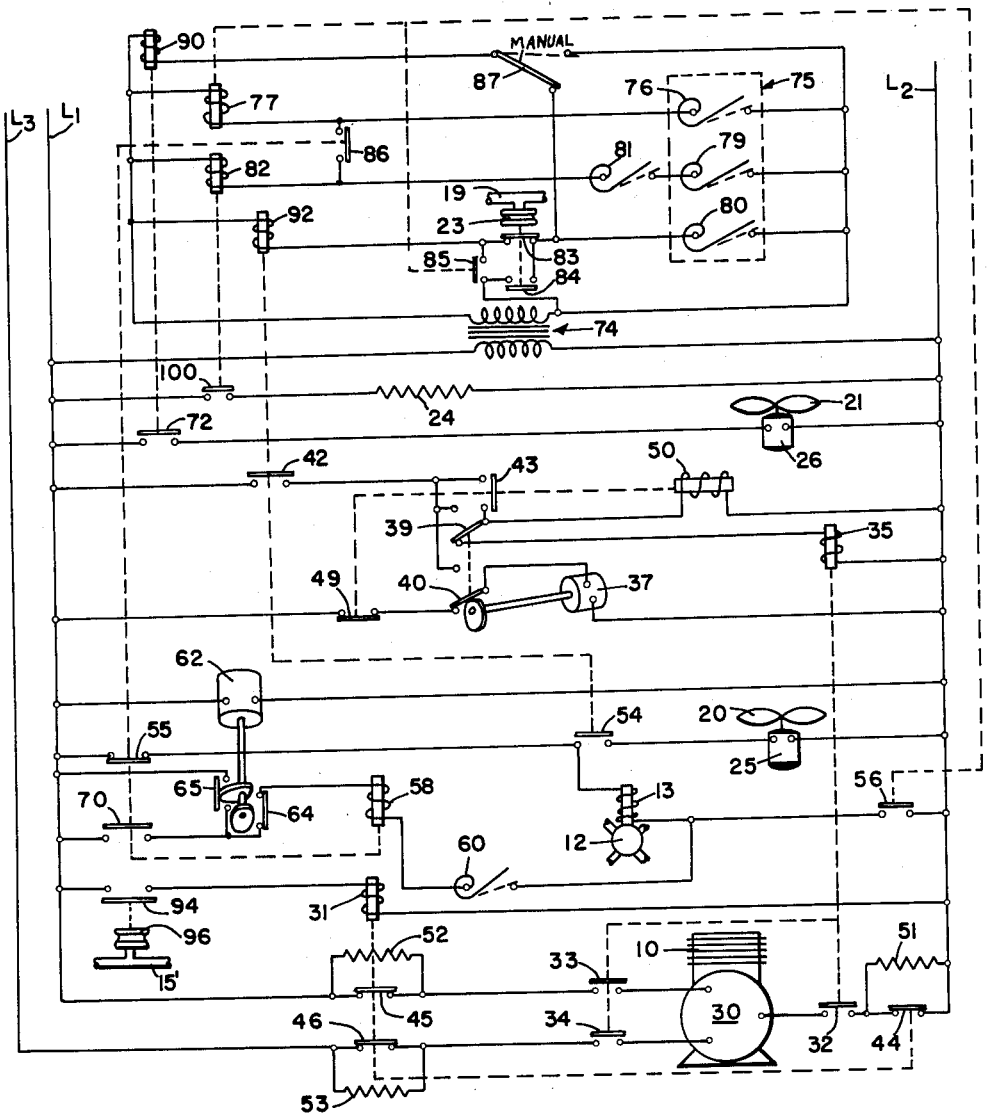

3,261,395
REFRIGERATION SYSTEM CONTROL
Theodore G. Foster, North Syracuse, and David N. Shaw, Liverpool, N.Y., assignors to Carrier Corporation, Syracuse, N.Y., a corporation of Delaware
Filed Jan. 8, 1964, Ser. No. 336,395
4 Claims. (Cl. 165—29)

This invention relates to a refrigeration system, and more particularly to a control arrangement for the refrigeration system compressor drive motor.

In refrigeration systems the operational load placed on the system compressor varies with changes in ambient conditions. The variation in compressor load may be substantial as in reverse cycle refrigeration systems where, during heating cycle operation at relatively low ambient temperature conditions, the system compressor is relatively lightly loaded while, during operation of the system on the cooling cycle at relatively high ambient temperature conditions, the system compressor operates at a maximum loading condition. Although the work load on the system compressor varies with changes in ambient conditions, changes in power input to the compressor drive motor, which is normally sized to accommodate the maximum anticipated system load condition, are slight. Thus, during periods of light load on the system compressor, for example during the aforementioned heating cycle operation of reverse cycle systems at relatively low ambient temperature conditions, power input to the compressor drive motor may exceed the power required to drive the system compressor. The excess power input to the compressor drive motor over and above that necessary to operate the compressor may result in motor overheating. In systems utilizing hermetic motor-compressor units where the system refrigerant passing to the compressor suction side is brought into heat exchange relation with the compressor drive motor, motor overheating reduces compressor volumetric efficiency and may result in excessive gas temperature at the compressor discharge side.

It is a principal object of the present invention to provide a new and improved arrangment for regulating power input to a refrigeration system compressor drive motor in accordance with variations in system operating conditions to obtain optimum motor efficiency.

It is an additional object of the present invention to provide an arrangement for regulating power input to the compressor drive motor in response to motor load.

It is an additional object of the present invention to provide in a reverse cycle refrigeration system a control arrangement for the compression means drive motor effective to reduce power input to the drive motor during heating cycle operation.

It is an object of the present invention to provide in a reverse cycle refrigeration system a control arrangement for regulating power input to the compressor drive motor and system supplementary heat.

It is a further object of the present invention to provide in a reverse cycle refrigeration system a control arrangement adapted to reduce power input to the compressor drive motor by converting a portion of the power input into system supplementary heat in response to predetermined ambient conditions.

This invention relates to an apparatus for conditioning an enclosure including a refrigeration system having an indoor heat exchange coil with fan means for bringing air into heat exchange relationship therewith, which comprises in combination compression means including a drive motor having plural power terminals, first switcihng means between each of the power terminals and a source of electrical energy adapted when actuated to energize the compressor drive motor, and means for regulating power input to the compressor drive motor including second switching means between at least one of the power terminals and the source of electrical energy, and resistance means across the second switching means, actuation of the second switching means causing energizing power to the motor on actuation of the first switching means to pass through the resistance means.

This invention further relates to an apparatus for selectively heating and cooling an enclosure including a reverse cycle refrigeration system having a heat exchange coil with fan means for bringing air into heat exchange relationship therewith for discharge into the enclosure, which comprises in combination compression means including a drive motor having plural power terminals, a first switch between each of the power terminals and a source of electrical energy adapted when actuated to energize the compressor drive motor, and means for regulating power input to the compressor drive motor including a second switch between at least one of the power terminals and the energy source, resistance means across each of the second switches adapted on opening of the second switches to reduce power input to the compressor drive motor, the resistance means being disposed in heat exchange relationship with the discharge air stream.

Other objects and advantages will be apparent from the ensuing specification and drawings in which:

FIGURE 3 is a wiring diagram illustrating an alternate control arrangement for the reverse cycle refrigeration system shown in FIGURE 1.

Figure 1:
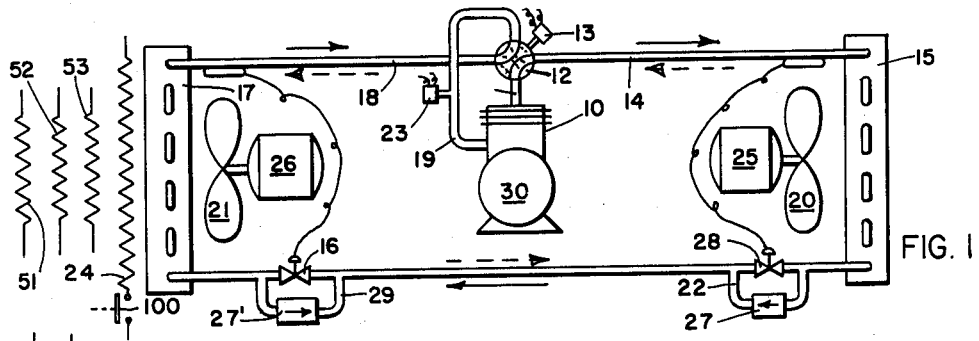
FIGURE 1 is a diagrammatic view of a reverse cycle refrigeration system forming the subject of this invention.

Referring more particularly to FIGURE 1 there is shown for the purpose of illustrating this invention an air-to-air heat pump employing a refrigeration system operable under the reverse cycle principle. In apparatus of this type, a first heat transfer coil is disposed within the area to be conditioned by the heat pump and a second coil is located outside the area, usually in the ambient.

Compressor 10 discharges relatively hot gaseous refrigerant through discharge line 11 to the reversing means 12, preferably a four-way reversing valve, which is employed for the purpose of reversing refrigerant flow through a portion of the system in order to obtain the desired heating and cooling effects. From reversing means 12, controlled by the operation of the solenoid 13 in a manner later to be described, the hot gaseous refrigerant flows during cooling cycle operation through line 14 to outdoor heat exchange coil 15 wherein condensation of the gaseous refrigerant occurs as ambient air is passed over the surface of outdoor coil 15 by fan 20.

The condensed liquid refrigerant flows from coil 15 through suitable expansion means 16 to indoor heat exchange coil 17, serving as an evaporator during the cooling cycle. Line 22 having check valve control 27 operable to permit flow in the direction shown by the solid line arrow provides a path for refrigerant flow around expansion means 28. The expansion means 16 provides the requisite pressure drop between the heat exchange coils in the refrigeration system during cooling cycle operation.

In indoor heat exchange coil 17, refrigerant is vaporized as heat is extracted from the stream of air delivered over the indoor coil by fan 21. Vaporous refrigerant so formed flows through line 18 to reversing valve 12 from whence the refrigerant flows through suction line 19 back to compressor 10 to complete the refrigerant flow cycle.

Compressor 10 and drive motor 30, operably connected thereto, are preferably encased in a common housing to form a hermetic unit. Where a hermetic motor-compressor unit is employed, suction gas flowing through line 19 to compressor 10 is brought into heat exchange relation with motor 30 to cool the motor, an arrangement well known to those skilled in the art.

Each of the fans 20 and 21 may be driven by suitable drive mechanism, for example, electric motors 25 and 16 respectively.

To heat the area to be treated, the reversing valve 12 is actuated to place line 18 in communication with discharge line 11. Under these circumstances heat from the hot gaseous refrigerant flowing into coil 17 is rejected to the air within the area to be treated. The rejection of heat from the refrigerant converts the gaseous refrigerant to liquid refrigerant which flows through expansion means 28 to outdoor coil 15, which now functions as an evaporator. Line 29 having check valve control 27′ operable to permit flow of refrigerant in the direction shown by the dotted line arrow, provides a path for refrigerant flow around expansion means 16. The vaporous refrigerant created in outdoor coil 15 as a result of heat transfer between the refrigerant and the ambient air flows through reversing valve 12 into suction line 19 back to compressor 10. Expansion means 28 provides the requisite pressure drop between heat exchange coils in the refrigeration system during heating cycle operation.

A suitable low pressure cutout control 23 may be connected to the suction line 19. Low pressure cutout control 23 actuates a switch in the electrical circuit as will be later described.

As above noted, the refrigeration system may be incapable of providing sufficient heat to the area to be treated during heating operation, especially when the heat pump is used in geographical areas which are subject to low outdoor ambient temperatures. An auxiliary heater 24 which consists of a suitable high resistance wire through which current is adapted to be selectively passed may be used to provide supplementary heat. Thus the air, heated to a certain degree by being induced through heat exchange coil 17 by fan 21, is further heated by being passed over resistance wire 24 which is energized upon closing of switch 100.

Figure 2:
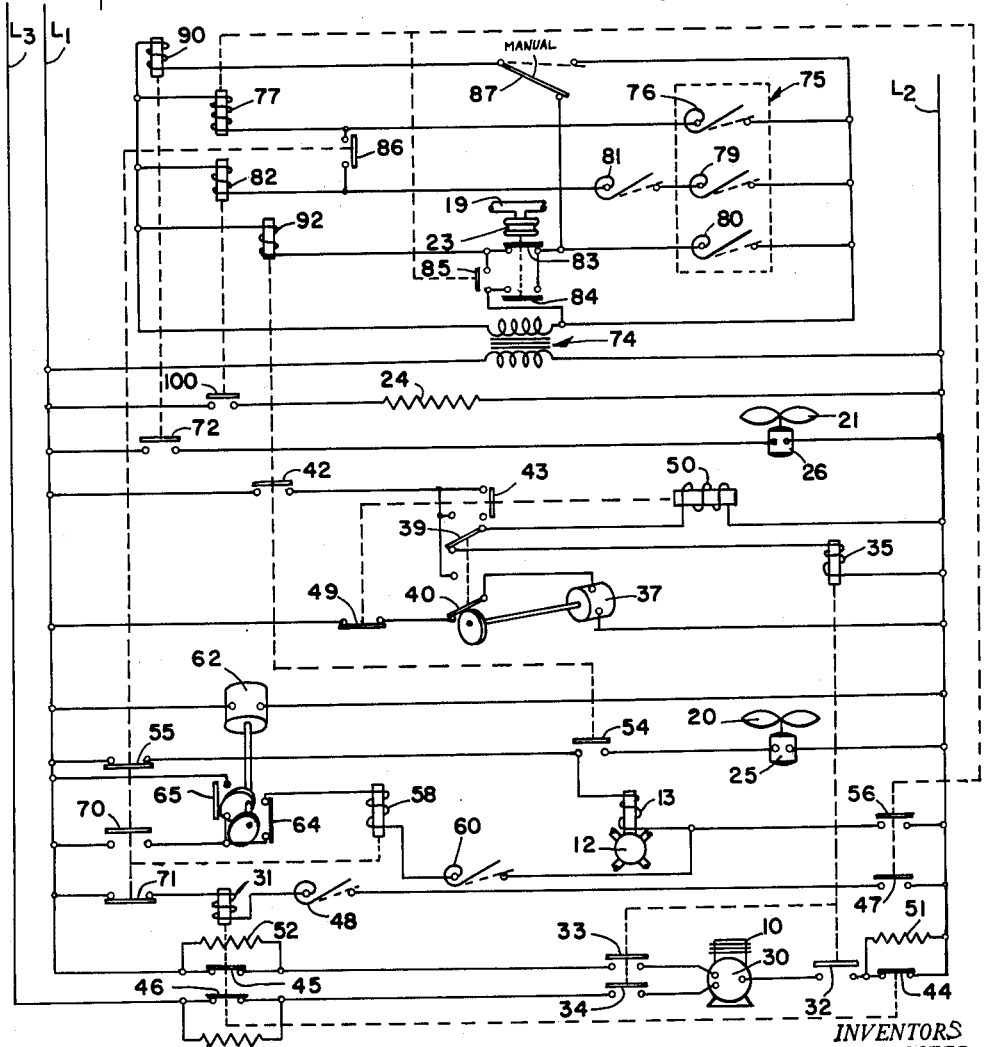
FIGURE 2 is a wiring diagram illustrating a preferred control arrangement for the reverse cycle refrigeration system shown in FIGURE 1.

Referring particularly to FIGURE 2 of the drawings, power leads $L_1$, $L_2$, $L_3$ are therein shown connected to compressor motor 30 through compressor contacts 32, 33, 34 and normally closed contacts 44, 45, 46 respectively. Power leads $L_1$, $L_2$, $L_3$ are connected to a suitable alternating current source. Contactor coil 35, when actuated in a manner to be more fully explained hereinafter, closes contacts 32, 33, 34 to complete a circuit from leads $L_1$, $L_2$, $L_3$ through contacts 32, 33, 34 and contacts 44, 45, 46 to energize compressor motor 30 to drive compressor 10. A resistor 51, 52, 53 is connected in parallel with each of normally closed contacts 44, 45, 46 respectively. Resistors 51, 52, 53 are suitably sized to provide a predetermined voltage drop thereacross as will be more fully explained hereinafter. Resistors 51, 52, 53 are preferably disposed adjacent the indoor coil 17 in heat exchange relationship with the stream of air discharged from indoor fan 21.

Actuation of contactor coil 35 and consequent energization of compressor motor 30 is regulated by timer motor 37 in response to a demand for heating or cooling. Timer motor 37 drives a suitable switch actuating mechanism such as cam means for moving timer switches 39 and 40 between the position shown in solid lines in FIGURE 2 of the drawings and that shown in dotted lines. Timer switch 39, when in the solid line position, connects contactor coil 35 in series with control switch 42 and switch 43 across leads $L_1$ and $L_2$. Timer switch 40, when in the solid line position, connects timer motor 37 in series with switch 49 across leads $L_1$ and $L_2$. A relay coil 50 for closing switch 43 and opening switch 49 is provided in parallel with contactor coil 35 across leads $L_1$ and $L_2$ in series with control switch 42 and switch 43.

Timer switch 39, when in the dotted line position, bypasses switch 43. Timer switch 40, when in the dotted line position, connects timer motor 37 in series with control switch 42 across leads $L_1$ and $L_2$.

A contactor coil 31 operable when energized to open normally closed contacts 44, 45, 46 is connected in series with defrost relay switch 71, reversing valve switch 47 and outdoor thermostat 48 across leads $L_1$ and $L_2$. Outdoor thermostat 48 is selected to close at a predetermined ambient temperature to limit energization of contactor coil 31 and consequent operation of compressor motor 30 at reduced voltage to periods of relatively low ambient temperature conditions. For example, outdoor thermostat may close at 40° F.

Outdoor fan motor 25 is connected in series with a control switch 54 and defrost switch 55 across leads $L_1$ and $L_2$. Reversing valve solenoid 13 is connected across leads $L_1$ and $L_2$ in series with defrost switch 55 and reversing valve switch 56.

A defrost relay coil 58 adapted when energized to initiate defrosting of outdoor coil 15 while terminating reduced power operation of compressor motor 30 is connected in series with defrost thermostat 60 across leads $L_1$ and $L_2$. Defrost timing motor 62 is connected in series across leads $L_1$ and $L_2$. The output shaft of defrost timing motor 62 is operatively connected by a suitable mechanism, such as cam means to a pair of defrost timer switches 64, 65 positioned in series with defrost relay coil 58 across leads $L_1$ and $L_2$. Defrost switch 70 parallels defrost timer switch 65 and is connected across leads $L_1$ and $L_2$ in series with defrost timer switch 64, defrost relay coil 58, defrost thermostat 60, and reversing valve switch 56. Defrost timer switch 65, normally open, and defrost timer switch 64, normally closed, are adapted to be periodically closed and opened respectively for a short duration in a predetermined sequence by the defrost timer motor driven mechanism in a manner to be more fully explained hereinafter. Indoor fan motor 26 is connected in series with indoor fan switch 72 across leads $L_1$ and $L_2$.

The secondary control circuit may be electrically connected to the primary control circuit by means of a transformer 74. Included in the secondary circuit is a room thermostat 75 comprising a two-stage heating thermostat and a single-stage cooling thermostat. The first stage of a heating thermostat 76 is in series with reversing valve relay 77. The second stage heating thermostat 79 is in series across outdoor thermostat 81 and resistance heater relay 82. When energized, relay 82 closes switch 100 to energize resistance heater 24. Defrost relay switch 86 is disposed across heating thermostat 76 and 79. Switch 86 is closed during the defrost operation to energize the resistance heater 24 in a manner to be more fully explained hereinafter.

Also provided in the secondary control circuit are fan switch 87, which may be manually moved from an automatic position, shown in solid line, to a continuous operating position, shown in dotted line, and indoor fan relay 90 in series therewith.

A control relay 92 is in series across the secondary circuit with a first low pressure switch 83 and cooling thermostat 80. Low pressure switch 83 is normally closed. A circuit connecting a second low pressure switch 84 and defrost relay switch 85 in series parallels low pressure switch 83. Closure of switches 84 and 85 bypasses low pressure switch 83. Low pressure switches 83 and 84 are opened and closed respectively in response to a predetermined suction pressure as sensed by low pressure cutout control 23.

*Operation*

During cooling operation, the cooling thermostat 80 of the room thermostat 75 will close in response to a predetermined demand for cooling. Assuming that the indoor fan switch arm 87 is in the solid line position permitting automatic operation thereof, indoor fan relay 90 is energized to close indoor fan relay switch 72 in the primary control circuit thus energizing indoor fan motor 26.

At the same time control relay 92 is energized to close control switches 42 and 54. A first circuit is completed via lead $L_1$, normally closed defrost relay switch 55, control switch 54 and lead $L_2$ to energize outdoor fan motor 25. A second circuit is completed via lead $L_1$, control switch 42, timer switch 39, in dotted line position, and lead $L_2$ to energize relay coil 50. Relay coil 50 closes switch 43 and opens switch 49. A third circuit is completed via lead $L_1$, control switch 42, timer switch 40 and lead $L_2$ to energize the timer motor 37. After a predetermined interval, the switch actuating mechanism driven by timer motor 37 moves timer switches 39 and 40 to the solid line position.

Movement of timer switch 39 to the solid line position completes a circuit from lead $L_1$ through control switch 42 and switch 43 to lead $L_2$ to energize contactor coil 35. Contactor coil 35 closes compressor control contacts 32, 33, 34 to energize the compressor motor 30 to drive compressor 10. Movement of timer switch 40 to the solid line position places timer motor 37 in series with switch 49, now open, to deenergize the timer motor.

During cooling operation, compressor 10 forwards high pressure vaporized refrigerant through reversing means 12 to line 14 and outdoor heat exchange coil 15. Heat is extracted from the refrigerant by the air stream passing over coil 15, condensing the refrigerant. Condensed refrigerant passes through metering means 16 to indoor heat exchange coil 17 where the refrigerant is vaporized. The vaporized refrigerant returns to compressor 10 through line 18, reversing means 12, and suction line 19.

Operation of the system on the heating cycle is initiated by closure of the first heating stage 76 of the room thermostat 75 in response to a demand for heating. Closure of first heating stage 76 energizes reversing valve relay 77 to close switches 47, 56 and 85. With outdoor thermostat 48, adapted to close at a predetermined outdoor temperature, for example 40° F., closed, closure of reversing valve switch 47 completes a circuit from lead $L_2$ through reversing valve switch 47, outdoor thermostat 48 and normally closed defrost relay switch 71 to lead $L_1$ to energize contactor coil 31 to open normally closed contacts 44, 45, 46. Closure of reversing valve switch 56 completes a circuit from lead $L_1$ through defrost relay switch 55 and reversing valve switch 56, to lead $L_2$ to energize reversing valve solenoid 13 to move reversing valve 12 to the heating position whereby upon energization of compressor 20, refrigerant in discharge line 11 passes through line 18 to indoor heat exchange coil 17. Closure of reversing valve switch 85 energizes control relay 92 to close control switches 42 and 54. Closure of control switch 42 energizes contactor coil 35 after a predetermined interval of time as described heretofore to close contacts 32, 33, 34 to complete a circuit from leads $L_1$, $L_2$, $L_3$ through contacts 32, 33, 34 and resistors 51, 52, 53 respectively to energize compressor motor 30 to drive compressor 10. Closure of control switch 54 effects energization of outdoor fan motor in the manner described heretofore.

Under the heating cycle of operation, refrigerant flows from indoor coil 17 through refrigerant metering means 16 to the outdoor coil 15. Heat rejected to the air passing over the indoor heat exchange coil warms the air being supplied to the area being conditioned. The hot vaporized refrigerant discharged from compressor 10 is condensed in the indoor coil 17. The refrigerant vaporized in outdoor coil 15 as a result of heat transfer between the refrigerant and the ambient air flows through reversing valve 12 into suction line 19 back to compressor 10.

The voltage drop across resistors 51, 52, 53 reduces power input to the motor 30. Since the load on the system compressor is normally reduced during heating cycle operation, the reduction in power input to the compressor motor enhances motor efficiency. In the preferred embodiment of the invention, resistors 51, 52, 53 are disposed in heat exchange relationship with the stream of air discharged from indoor fan 21 into the enclosure being conditioned. Heat dissipated by resistors 51, 52, 53 by the passage of electrical energy therethrough is accordingly used to supplement refrigerant system heat.

During heating cycle operation, ambient conditions may be such that a coating of frost and/or ice forms on outdoor coil 15. The defrost control means depicted in FIGURE 2 are operable to sense this accumulation of frost and/or ice and in response thereto, to temporarily reverse the system to cause the system to act on the defrost cycle to remove the accumulated frost and/or ice.

Defrost timer motor 62 operates continuously. Periodically the switch actuating mechanism driven by the defrost timer motor closes defrost timer switch 65 for a brief interval. When defrost thermostat 60 senses a need for defrost and closes, a circuit is completed at the closure of defrost timer switch 65 via lead $L_1$, defrost timer switches 64 and 65, defrost thermostat 60, reversing valve switch 56, and lead $L_2$ to energize defrost relay 58. Defrost relay 58 closes defrost relay switch 70 to provide a holding circuit therefor and opens defrost relay switches 55, 71 to deenergize reversing valve solenoid 13 and outdoor fan motor 25, and contactor coil 31 to close contacts 44, 45, 46. Closure of contacts 44, 45, 46 short-circuits or shunts resistors 51, 52, 53 whereby full power is applied to compressor drive motor 30. At the same time, defrost relay 58 closes defrost relay switch 86 to permit energizaton of the auxiliary resistance heater 24 in a manner to be more fully explained hereinafter.

Deenergization of reversing valve solenoid 13 permits reversing valve 12 to move to the position shown in FIGURE 1 of the drawings whereby hot gaseous refrigerant from the compressor 10 is passed directly to outdoor coil 15 to remove frost and ice accumulated thereon.

As noted, during the defrost cycle, defrost relay switch 55 is open and outdoor fan motor 25 is accordingly deenergized. It is, however, desirable that the indoor fan be operative to provide a loaded evaporator whereby evaporator head pressure is maintained to insure the discharge of relatively hot gaseous refrigerant from the compressor. Continued operation of indoor fan 21 during the defrost cycle is assured in the following manner. The build-up of ice on outdoor coil 15 results in a drop in suction pressure. At a predetermined suction pressure, low pressure cutout 23 will open switch 83 and close switch 84. Closure of switch 84 maintains the circuit through indoor fan relay 90 to keep indoor fan control switch 72 and the indoor fan motor 26 operating.

Upon removal of the frost and ice from outdoor coil 15, defrost thermostat 60 opens. Additionally, normally closed timer switch 64 is opened for a brief interval by the defrost timer motor driven switch actuating mechanism within a predetermined time after closure of timer switch 65. If defrost thermostat 60 opens within the predetermined time before timer switch 64 opens, defrost relay 58 is deenergized to terminate the defrost cycle in a manner to be described hereinafter. Should defrost thermostat 60 not open within the predetermined time before timer switch 64 is opened by the defrost timer motor 62, the opening of timer switch 64 deenergizes defrost relay 58 to terminate the defrost cycle. Deenergization of defrost relay 58 upon the opening of either defrost thermostat 60 or defrost timer switch 64, permits defrost relay switches 55, 71 to close. Closure of switch 55 completes a circuit from lead $L_1$ through switch 55 and reversing valve switch 56 to lead $L_2$ to energize reversing valve solenoid 13 to move reversing valve 12 to the heating position. A circuit is completed from lead L₁ through defrost relay switch 55 and control switch 54 to lead L₂ to energize outdoor fan motor 25. Closure of switch 71 completes a circuit from lead L₁ through switch 71, outdoor thermostat 48 and switch 47 to lead L₂ to energize contactor coil 31 to open contacts 44, 45, 46.

If during operation of the system on the heating cycle, the demand for heat exceeds that capable of being supplied by the system and resistors 51, 52, 53, second stage heating thermostat 79 of indoor thermostat 75 will close at a predetermined temperature. In series with the auxiliary heater relay 82 and thermostat 79 is an outdoor thermostat 81. Outdoor thermostat 81 closes in response to a predetermined outdoor temperature. Closure of both second stage heating thermostat 79 and outdoor thermostat 81 energizes auxiliary heater relay 82 to close switch 100 energizing resistance heater 24 to provide supplementary heat.

The heretofore described defrost control arrangement causes the system to revert to cooling cycle operation. During cooling cycle operation, the indoor coil 17 functions as an evaporator. It is desirable during defrost cycle that indoor fan 21 be maintained in operation. However, the air blown over the indoor coil 17 during defrost cycle operation is chilled resulting in discomfort to occupants of the room being conditioned.

In the present heat pump control arrangement, air discharged into the room by the indoor fan 21 during the defrost cycle is tempered. This is effected by maintaining the auxiliary heater relay 82 energized during defrost cycle operation. As noted heretofore, defrost relay switch 86 is closed on the defrost cycle. Closure of switch 86 completes a circuit through first stage heating thermostat 76 and defrost relay switch 86 to energize heater relay 82 to close switch 100 and energize resistance heater 24.

In the embodiment shown in FIGURE 3 of the drawings wherein like numerals refer to like parts, contactor coil 31 is connected in series with pressure responsive switch 94 across leads L₁ and L₂. Pressure responsive switch 94 includes in actuating bellows 96 in communication with refrigerant line 15′ of outdoor heat exchange coil 15. Pressure responsive switch 94 is adapted to close in response to predetermined refrigerant pressure in outdoor coil 15.

Closure of switch 94 in response to a predetermined refrigerant pressure in outdoor coil 15 completes the circuit from lead L₁ through switch 94 to lead L₂ to energize contactor coil 31 to open switches 44, 45, 46. With switches 44, 45, 46 open, energization of compressor motor 30 is through resistors 51, 52, 53 in the manner described heretofore. By the control arrangement of FIGURE 3, power input to the compressor motor 30 is regulated in response to outdoor coil conditions.

It is understood that suitable outdoor coil temperature responsive switch means may be used in place of the outdoor coil pressure responsive switch mechanism 94, 96.

The system illustrated in FIGURES 2 and 3 of the drawings may be operated on single phase current if suitably modified. Where single phase operation is desired in place of the polyphase operation illustrated in FIGURES 2 and 3 of the drawings, a single normally closed switch contact, adapted to be opened by contactor coil 31 upon energization thereof, with a suitably sized resistance connected thereacross, is preferably connected in series with one of the motor energizing lines. Energization of contactor coil 31 in the manner described heretofore opens the normally closed switch bridging the resistance whereby energy to the compressor drive motor passes through the resistance to reduce power input to the compressor drive motor. As noted heretofore, the compressor motor power reducing resistor is preferably positioned adjacent indoor heat exchange coil 17 in heat exchange relationship with the stream of air passed thereacross by indoor fan 21 to supplement system heat.

While we have described a preferred embodiment of the invention, it will be understood that the invention is not limited thereto since it may be otherwise embodied within the scope of the following claims.

We claim:

1. In a reverse cycle refrigeration system having a compressor, an outdoor coil, expansion means, and an indoor coil interconnected to form a closed refrigeration circuit adapted upon actuation of said compressor to cool, fan means for bringing air into heat exchange relation with said indoor coil, and reversing means interposed in said refrigeration circuit between said compressor and said indoor and outdoor coils effective when actuated to reverse the flow of refrigerant through said indoor coil, expansion means and outdoor coil to heat, the combination of a drive motor for said compressor; first switching means between said drive motor and a source of electrical energy effective when actuated to complete an energizing circuit to said drive motor; means for reducing input of electrical energy to said drive motor including resistance means disposed downstream of said indoor coil, and second switching means for serially connecting said resistance means between said drive motor and said source of electrical energy; and control means for actuating said second switching means in response to operation of said system only on the heating cycle.

2. The system according to claim 1 in which said control means actuates said second switching means in response to actuation of said reversing means.

3. The system according to claim 2 including means responding to a predetermined ambient temperature condition to override said control means and prevent actuation of said second switching means.

4. The system according to claim 1 in which said control means includes means to actuate said second switching means at a predetermined outdoor coil condition.

References Cited by the Examiner

UNITED STATES PATENTS

| 2,232,587 | 2/1941 | Brandt | 165—16 |
| 2,289,082 | 7/1942 | Stevenson | 165—16 |

ROBERT A. O'LEARY, *Primary Examiner.*

CHARLES SUKALO, *Examiner.*